Dec. 26, 1939.  J. P. CHAMBERLAIN  2,185,073
PORTABLE WEIGHING DEVICE
Filed March 1, 1938
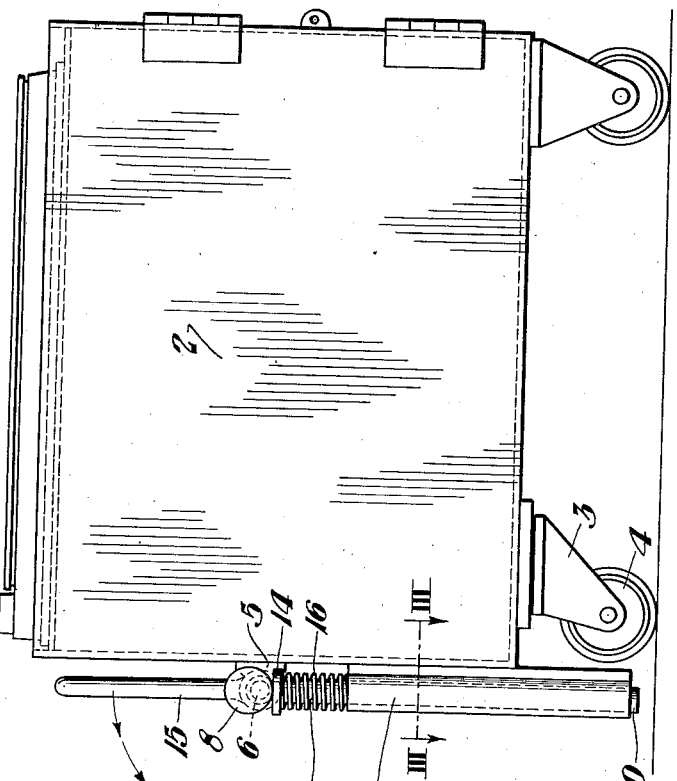
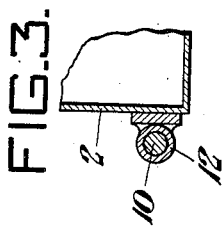
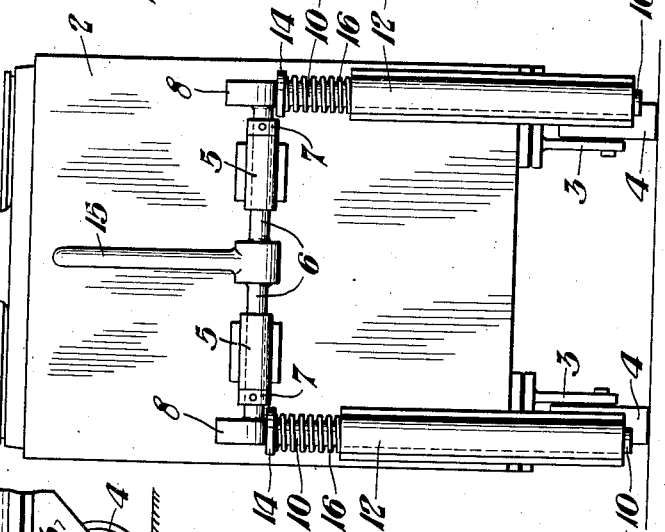
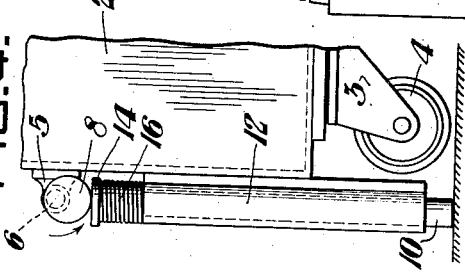
Inventor:
JULIUS P. CHAMBERLAIN,
by: Usina & Rauber
his Attorneys.

Patented Dec. 26, 1939

2,185,073

UNITED STATES PATENT OFFICE 2,185,073

PORTABLE WEIGHING DEVICE

Julius P. Chamberlain, Homestead, Pa.

Application March 1, 1938, Serial No. 193,362

1 Claim. (Cl. 280—44)

This invention relates to weighing devices and, more particularly, to platform type scales which are adapted for portability by wheel mounting arrangements.

In assorting and shipping departments of various industries, there are many applications of platform scales mounted on wheels. The scales used are of conventional design and, in some cases, the wheels are fixed directly to the scale framework.

In the application to tin-mill assorting room use, the platform scale is usually mounted on a table of suitable height and provided with fixed wheels mounted on a simple axle. The portable scales heretofore available for such use have not been entirely satisfactory for several reasons: (1) the fixed mounting of the wheels provided only for straight line motion, thus requiring that either the wheels be skidded laterally or that the table and scales be lifted in order to change the direction of motion; (2) the wheel mounting arrangements were not designed to minimize the effects of the rough service to which such scales were ordinarily subjected; and (3) when it was desired to use the scales in a particular position the wheels had to be chocked in order to maintain the scales in such position.

It is an object of my invention to provide a scale with an improved portable mounting arrangement which is adapted for convenient movement from one location to another.

Another object of my invention is to provide a device of the class described, which will withstand rough service so as to prevent misalignment of the scale mechanism and consequent necessary readjustment.

Still another object of my invention is to provide a scale with facilitates for positively maintaining the scale immovable in any and all positions.

The foregoing and other objects will be apparent after referring to the drawing in which:

Figure 1 is a side elevation of the device of the invention.

Figure 2 is an end view of the showing of Figure 1.

Figure 3 is a sectional view on the line III—III of Figure 1.

Figure 4 is a fragmentary elevation illustrating a detail.

Referring more particularly to the drawing, the numeral 2 designates a fabricated steel table forming the portable carriage for a conventional scale to be later described. The limitation of uni-directional movement which heretofore has been caused by the usual fixed wheel bracket mountings is in the present invention overcome by providing at least one end of the fabricated steel table with freely swiveling wheel brackets 3. Wheels 4 of ball or roller bearing design are mounted on these brackets 3 and may be equipped with either pneumatic or with solid rubber tires. By this construction free mobility of the table is obtained, and means is provided to absorb the shocks of rough usage.

The most essential feature of the invention is the means developed to prevent shifting of the table, which causes frequent misalignment of the scale mechanism and which requires repeated adjustment of the scale balance. Accordingly, one end of the table 2 has welded thereto a pair of horizontally aligned bearings 5. A cam-shaft 6 is journaled in the bearings 5 by collars 7 fastened to the shaft as shown. At each end of the cam-shaft 6 there is fixedly carried a cam 8. Immediately below each of these cams 8 is a plunger 10 disposed for vertical movement only. These plungers 10 are carried by cylindrical guides 12. Each of the plungers 10 carries on its upper end a cap 14 having a wear-resisting top surface, such as a coating of "Stellite" or its equivalent. Midway between the ends of the cam-shaft 6 and fixedly attached thereto is a hand lever 15 which is normally maintained in a vertical position by compression springs 16 which encompass the plungers 10 and rest on the upper ends of the guides 12.

In operation, the table 2 is readily and conveniently moved to a new location without the necessity of skidding the wheels and without mishandling of the table or the scales 17 in order to change the direction of travel. The table may be moved rapidly from one location to another, over an uneven floor surface, without risk of injury to the scales 17, due to shock, etc. On being brought into the desired new position, the operator, by pulling the lever 15 downwardly, rotates the cam-shaft 6 and the cams 8 at each end thereof in such a manner as to bear downwardly upon the caps 14 of the plunger 10 until the continued downward travel of the plungers has placed the lower ends thereof in contact with the floor. By the downward manual movement of the hand lever 15 the weight at one end of the table 2 is transferred from the swivel wheels 4 to the plungers 10, the action of which is to maintain the table stationary until such time as the weighing operation is completed and the plungers are retracted by manual upward movement of the lever 15. During the actual weighing operation there is no tendency on the part of the table 2 or of the scale 17 thereon to become laterally shifted, which movement, in the majority of cases, would cause the scale beam to become unbalanced and would necessitate a readjustment to the correct level.

While I have shown and described one preferred embodiment of this invention, it is to be understood that I am not to be limited thereto, as various modifications may be made without departing from the scope of the following claim.

I claim:

A freely portable truck comprising wheels constructed and arranged to entirely support it, and means for anchoring said freely portable truck in a chosen position; said means including a horizontal shaft rotatably mounted on one end of said freely portable truck, a cam secured to each end of said horizontal shaft, a vertically movable floor-contacting plunger disposed beneath and operated by each of said cams, a lever for rotating said horizontal shaft, and a coiled compression spring for influencing each of said floor-contacting plungers against the adjacent cam and out of contact with the floor upon which said freely portable truck is movable.

JULIUS P. CHAMBERLAIN.